(12) United States Patent
Han

(10) Patent No.: US 7,448,587 B2
(45) Date of Patent: Nov. 11, 2008

(54) STAND FOR SUPPORTING COMPUTER

(75) Inventor: Shao-Bo Han, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 396 days.

(21) Appl. No.: 11/114,688

(22) Filed: Apr. 25, 2005

(65) Prior Publication Data

US 2006/0049326 A1     Mar. 9, 2006

(30) Foreign Application Priority Data

Sep. 6, 2004     (CN) .................... 2004 2 0083970

(51) Int. Cl.
*A47B 91/00* (2006.01)
(52) U.S. Cl. .............. 248/346.07; 248/188.7; 248/188.6; 439/327; 361/740; 211/41.6
(58) Field of Classification Search ............ 248/346.07, 248/188.7, 188.6, 678, 680, 346.03, 346.06, 248/292.12, 671, 154, 316.1, 316.5, 676; 439/327, 377, 64; 361/740, 754, 727, 684; 211/41.6, 195, 132.1
See application file for complete search history.

(56) References Cited

U.S. PATENT DOCUMENTS

| | | | | |
|---|---|---|---|---|
| 117,167 | A | * | 7/1871 | Gibson .................. 403/93 |
| 1,161,762 | A | * | 11/1915 | Bartlett .................. 248/310 |
| 2,743,893 | A | * | 5/1956 | Spangler et al. ............. 248/146 |
| 3,932,016 | A | * | 1/1976 | Ammenheuser ............ 439/377 |
| 4,080,031 | A | * | 3/1978 | Sawford-Atkins ........... 439/377 |
| 4,535,896 | A | * | 8/1985 | Evenson .................. 211/132.1 |
| 4,648,009 | A | * | 3/1987 | Beun et al. .................. 361/759 |
| 4,698,024 | A | * | 10/1987 | Maxwell ...................... 439/62 |
| 5,687,060 | A | * | 11/1997 | Ruch et al. .................. 361/686 |
| 5,774,332 | A | * | 6/1998 | Ruch et al. .................. 361/686 |
| 5,794,913 | A | | 8/1998 | Ho |
| 5,829,601 | A | * | 11/1998 | Yurchenco et al. ....... 211/41.17 |
| 5,846,095 | A | * | 12/1998 | Bowen ....................... 439/157 |
| 5,889,656 | A | * | 3/1999 | Yin .............................. 361/801 |
| 5,980,299 | A | * | 11/1999 | Davis ......................... 439/377 |
| 6,000,960 | A | * | 12/1999 | Wang et al. ................. 439/327 |
| 6,038,131 | A | * | 3/2000 | Valosen et al. ............. 361/756 |
| 6,056,583 | A | * | 5/2000 | Lee et al. .................... 439/377 |
| 6,059,384 | A | * | 5/2000 | Ho ........................... 312/223.2 |
| 6,064,574 | A | * | 5/2000 | Yu et al. ..................... 361/704 |
| 6,083,026 | A | * | 7/2000 | Trout et al. ................. 439/328 |

(Continued)

FOREIGN PATENT DOCUMENTS

CN         95211103.9         9/1996

*Primary Examiner*—Kimberly T. Wood
(74) *Attorney, Agent, or Firm*—Morris, Manning & Martin LLP; Tim Tingkang Xia

(57) ABSTRACT

A stand (20) for supporting a computer chassis (10) includes a support body (22), and a pair of clamping ledges (30) pivotally attached to the support body. The support body forms two resilient portions (25) corresponding to each clamping ledge. Each resilient portion forms a protrusion (34). Each clamping ledge corresponding to each resilient portion forms a pair of cutouts (36, 37). The pair of cutouts engages with the corresponding protrusion, respectively, to keep the corresponding clamping ledge in an upright position and horizontal position.

17 Claims, 4 Drawing Sheets

U.S. PATENT DOCUMENTS

| | | | |
|---|---|---|---|
| 6,089,899 A * | 7/2000 | Wang et al. | 439/377 |
| 6,089,900 A * | 7/2000 | Ma | 439/377 |
| 6,147,873 A * | 11/2000 | Huang | 361/759 |
| 6,168,450 B1 * | 1/2001 | Davis et al. | 439/327 |
| 6,311,941 B1 * | 11/2001 | Feldmeyer | 248/188.8 |
| 6,315,263 B1 * | 11/2001 | Wang | 248/694 |
| 6,364,278 B1 * | 4/2002 | Lin et al. | 248/676 |
| 6,419,198 B1 * | 7/2002 | Einav | 248/346.07 |
| 6,437,987 B1 * | 8/2002 | Lin | 361/756 |
| 6,875,101 B1 * | 4/2005 | Chien | 454/184 |

* cited by examiner

STAND FOR SUPPORTING COMPUTER

BACKGROUND OF THE INVENTION

1. Field of the Invention

The present invention relates to stands for readily and stably supporting a computer.

2. Background of the Invention

A desktop computer generally includes two types: a tower computer and a horizontal computer. Consumers choose the type of the desktop computer in accordance with their needs. For meeting different needs, a computer of a tower type or a horizontal type is provided. Due to the compact size trend, a horizontal type of computer is made thinner than before. If a user wants to let his/her horizontal-type computer to stand like a tower-type computer, the positioning stability of the horizontal-type computer may be unqualified. It is requisite to provide stands for supporting a horizontal-type computer when it is used like a tower-type computer.

A conventional stand is often secured to a bottom of a computer chassis via a plurality of screws. However, using extra tools to screw or unscrew the screws makes the assembly or disassembly process unduly cumbersome.

A conventional stand such as disclosed in U.S. Pat. No. 6,364,278, includes two coupled supporting members. Each supporting member includes a dove-tail shaped protrusion to couple with a recess of the other supporting member. This structure is simple and readily to be assembled. However, a clamping ledge is integrally formed from each supporting member. Therefore, before the stand is assembled to the computer chassis, the stand occupies a rather large space, which is inconvenient in transport or in carry.

What is needed is to provide stands for readily and stably supporting a computer.

What is also needed is to provide computer stands which are readily to be carried and space-saving.

SUMMARY

A stand in accordance with a preferred embodiment of the present invention is disclosed for supporting a computer chassis. The stand includes a support body, and a pair of clamping ledges pivotally attached to the support body. The support body forms two resilient portions corresponding to each clamping ledge. Each resilient portion forms a protrusion. Each clamping ledge corresponding to each resilient portion forms a pair of cutouts. The pair of cutouts engages with the corresponding protrusion, respectively, to keep the corresponding clamping ledge in an upright position and horizontal position.

Other objects, advantages and novel features of the invention will become more apparent from the following detailed description when taken in conjunction with the accompanying drawings, in which:

DETAILED DESCRIPTION OF THE INVENTION

Figure 1:
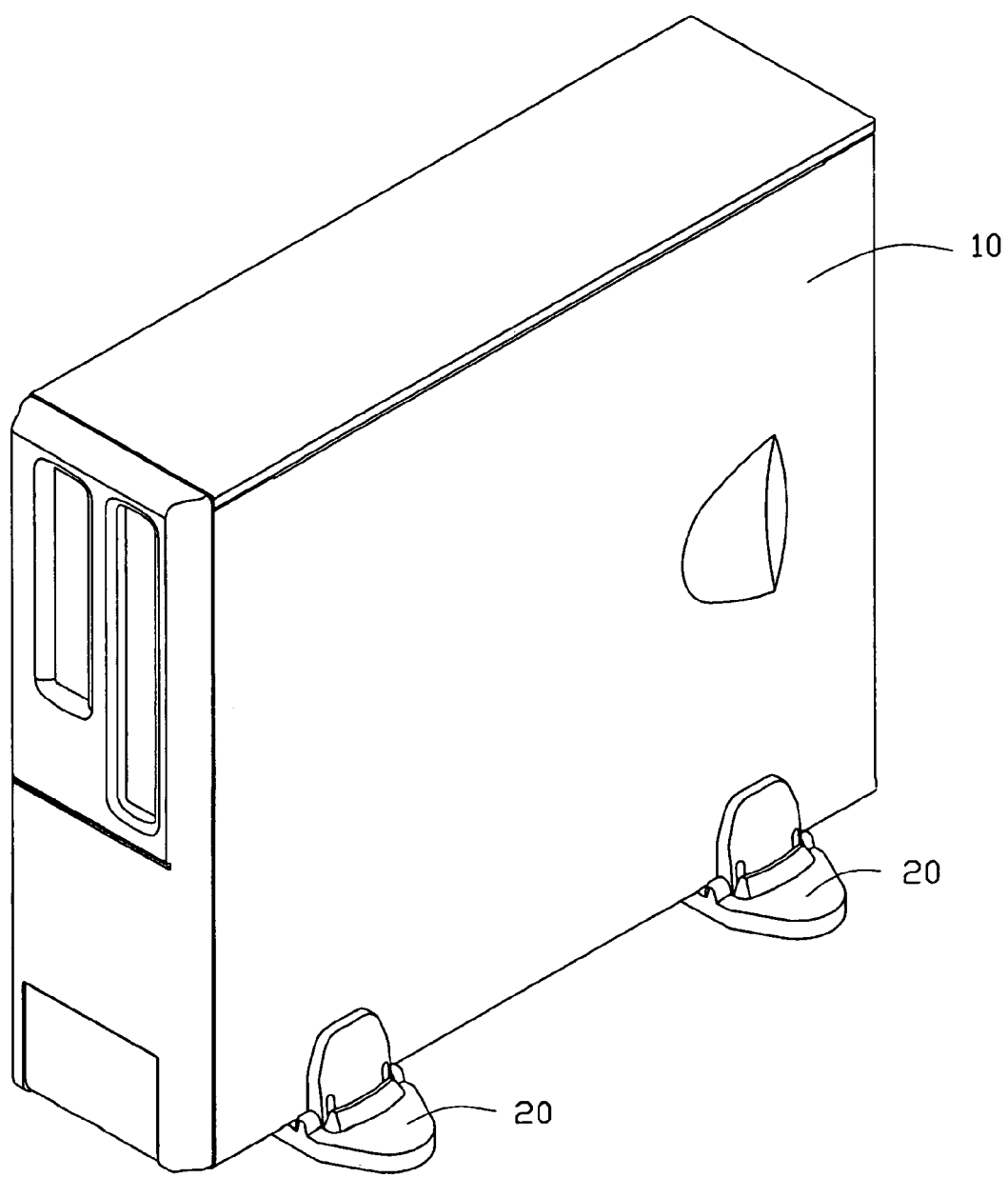
FIG. 1 is an assembled, isometric view showing a pair of stands in accordance with a preferred embodiment of the present invention supporting a computer chassis.

Referring to FIG. 1, a pair of stands 20 in accordance with a preferred embodiment of the present invention corporately supports a chassis 10 of an electronic device like a computer.

Figure 2:
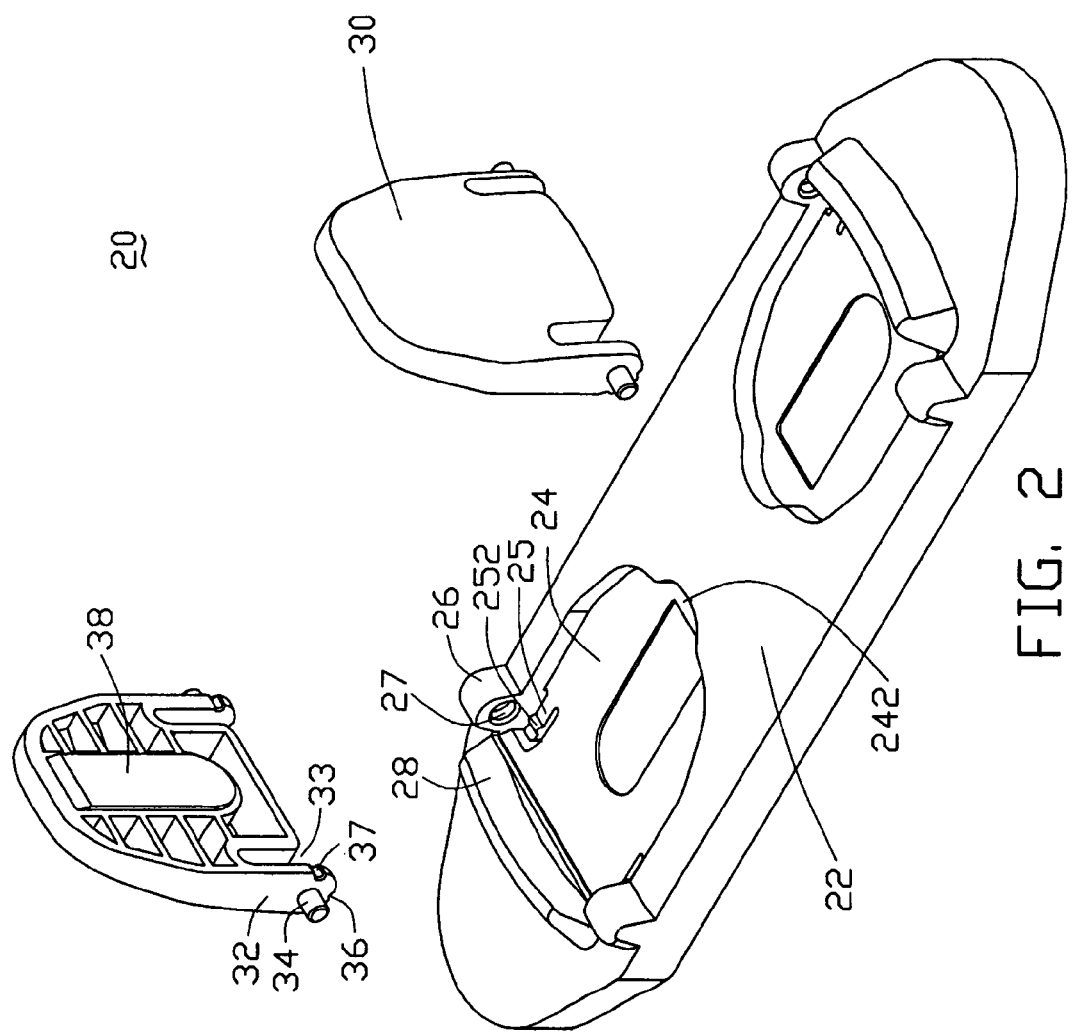
FIG. 2 is an exploded, isometric view of one of the stands of FIG. 1.

Referring to FIG. 2, each stand 20 includes a support body 22, and a pair of clamping ledges 30. Two opposite recesses 24 are defined in an upper surface of the support body 22 for receiving clamping ledges 30. Contour or profile of each recess 24 is similar to that of the clamping ledge 30. A dent 242 is defined in an edge of each recess 24 for facilitating grasping the clamping ledge 30. A longitudinal block 28 is formed on the support body 22 adjacent to the other edge of each recess 24. A pair of bulges 26 is formed on the support body 22 at opposite sides of the other edge of each recess 24. A pivot hole 27 is defined in each bulge 26. A pair of cantilevered resilient portions 25 is formed at a bottom of each recess 24, and respectively in the vicinity of the bulges 26. A first engaging portion 252 is formed on a fee end of each resilient portion 25. Preferably, the first engaging portion 252 is an arc-shaped protrusion.

Each clamping ledge 30 forms a pair of arm portions 32 at opposite sides of a bottom portion thereof. A space 33 provided for resilient deformation is defined between each arm portion 32 and the bottom portion of the clamping ledge 30. A pivot post 34 extends from an outer surface of each arm portion 32. A bottom of each arm portion 32 is curved, and forms two second engaging portions. In this preferred embodiment, the second engaging portions include a first cutout 36 and a second cutout 37. A rubber pad 38 is mounted to an inner side of clamping ledges 30 for anti-sliding.

Figure 3:
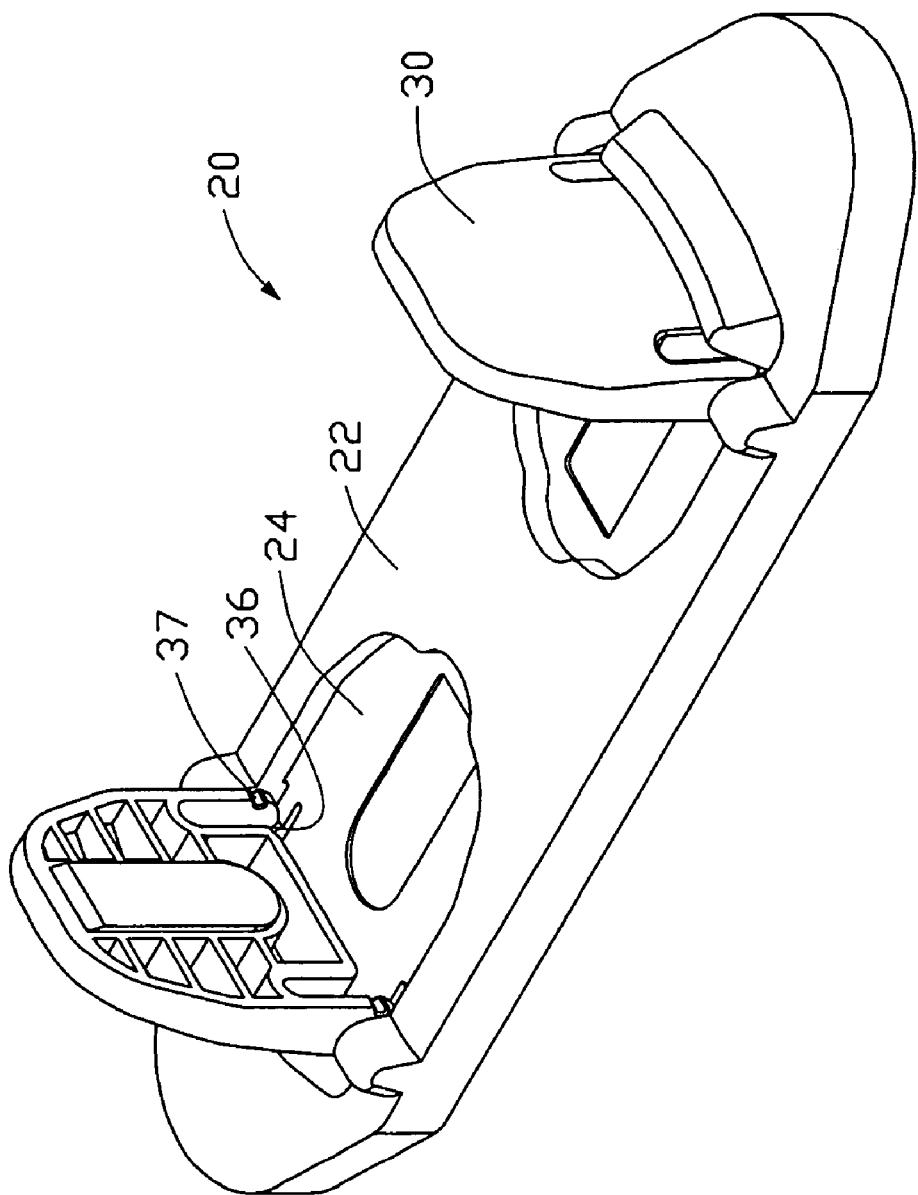
FIG. 3 is an assembled view of FIG. 2, showing clamping ledges of the stand in an upright portion.
Figure 4:
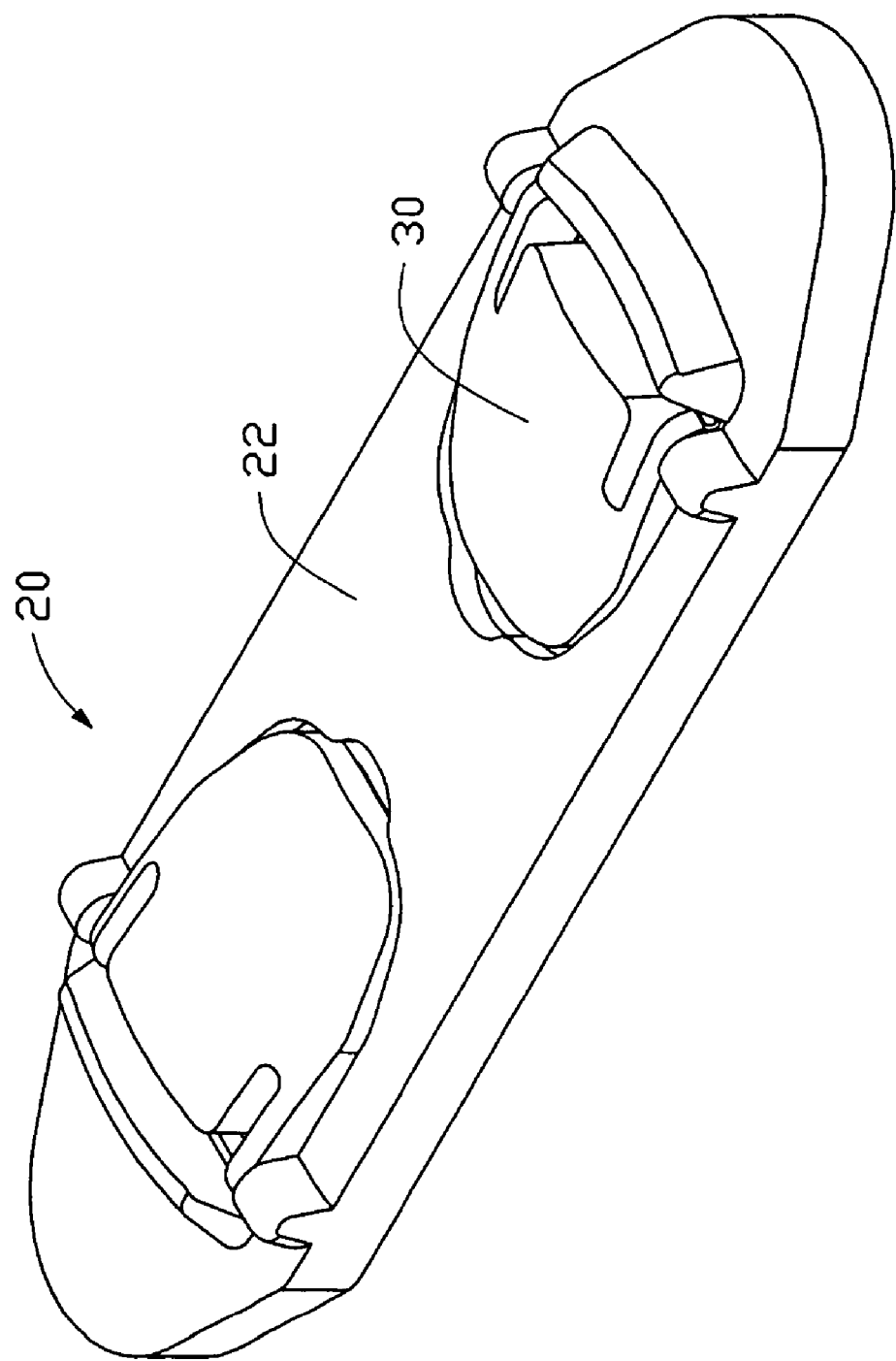
FIG. 4 is similar to FIG. 3, but showing the clamping ledges of the stand in a horizontal position.

Referring also to FIGS. 3 and 4, in assembly, the arm portions 32 of each clamping ledge 30 are pressed inwardly so that the pivot posts 34 are received in the pivot holes 27 of the bulges 26. The computer chassis 10 is put on the support body 22 with the clamping ledges 30 clamping the computer chassis 10 therebetween. At this situation, the first cutouts 36 of the clamping ledges 30 engage with the protrusions 252 of the resilient portions 25 of the support body 22, respectively. The clamping ledges 30 are thereby positioned at an upright position. The rubber pads 38 of the clamping ledges 30 abut against the computer chassis 10, so that the computer chassis 10 is not easily moved. In removing the computer chassis 10, the clamping ledges 30 are slightly pulled outwardly. The block 28 prevents the clamping ledge 30 from being over turned out. Some rubber pads are mounted to a bottom surface of the support body 22.

Without the computer chassis 10, the clamping ledges 30 of the stand 20 are rotated inwardly, to be accommodated in the corresponding recesses 24. At this time, the second cutouts 37 of the clamping ledges 30 engage with the protrusions 252 of the resilient portions 25 of the support body 22. The clamping ledges 30 are thereby positioned at a horizontal position.

The stands 20 readily and stably support the computer chassis 10. Furthermore, the stands 20 are space-saving because the clamping ledges 30 are capable of folded down.

In another embodiment, the first engaging portions 252 may be cutouts, accordingly, the second engaging portions 36, 37 may be protrusions.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A stand for supporting a computer chassis, the stand comprising:
   a support body comprising at least two resilient portions, a protrusion formed from each of the resilient portions, the support body comprising an upper surface for supporting a bottom of the computer chassis; and
   two clamping ledges pivotably attached to the support body for clamping the computer chassis therebetween, each of the clamping ledges comprising a first cutout to engage with the protrusion of the support body for keeping the clamping ledges upright such that the clamping ledges clamping two opposite sidewalls of the computer chassis, and a second cutout to engage with the protrusion of the support body for keeping the clamping ledges horizontal, wherein each of the clamping ledges comprises an arm portion, the first cutout is defined in a bottom end of the arm portion, and the second cutout is defined in a side of the arm portion, and wherein each of the clamping ledges pivots around an axis that is parallel to the upper surface of the support body.

2. The stand as claimed in claim 1, wherein each of the clamping ledges comprises the arm portion at each of opposite sides thereof, a space provided for resilient deformation is defined between the arm portion and the clamping ledge.

3. The stand as claimed in claim 1, wherein an outer surface of the arm portion forms a pivot post outwardly, two bulges forms from the support body corresponding to each of the clamping ledges, each of bulges defines a pivot hole for receiving the pivot post.

4. The stand as claimed in claim 1, wherein the support body comprises a block at an outer side of the pivot axis of each of the clamping ledges for preventing a corresponding clamping ledge from over rotation outward.

5. The stand as claimed in claim 4, wherein two recesses are defined in the upper surface of the support body from the blocks toward each other for totally receiving the clamping ledges in the upper surface.

6. The stand as claimed in claim 5, wherein a dent is defined in an edge of the recess for facilitating grasping a corresponding clamping ledge.

7. The stand as claimed in claim 1, wherein each of the resilient portions is a cantilever, the protrusion is formed at a free end of the cantilever.

8. The stand as claimed in claim 1, wherein a rubber pad is mounted to an inner surface of each of the clamping ledges.

9. A stand for supporting a computer chassis, comprising:
   a support body forming at least two resilient portions, each of the resilient portions forming a first engaging portion; and
   two clamping ledges pivotably attached to the support body for clamping two opposite sides of the computer chassis, each of the clamping ledges forming two second engaging portions corresponding to the first engaging portion; wherein
   the first engaging portion selectively engages with the second engaging portions to keep a corresponding clamping ledge in an upright position and horizontal position, wherein each of the resilient portions is a cantilever, the first engaging portion is formed at a free end of the cantilever;
   wherein each of the clamping ledges forms an arm portion at each of opposite sides thereof, a space provided for resilient deformation is defined between the arm portion and the clamping ledge.

10. The stand as claimed in claim 9, wherein the first engaging portion comprises a protrusion, each of the second engaging portions comprises a cutout.

11. The stand as claimed in claim 9, wherein an outer surface of the arm portion forms a pivot arm outwardly, two bulges forms from the support body corresponding to each of the clamping ledges, each of bulges defines a pivot hole for receiving the pivot post.

12. The stand as claimed in claim 9, wherein the support body comprises a block for preventing a corresponding clamping ledge from over rotation.

13. The stand as claimed in claim 9, wherein a recess is defined in the support body for receiving each of the clamping ledges.

14. An electronic device comprising:
   a chassis enclosing said electronic device; and
   a stand attachable to said chassis to support said chassis positioned in a predetermined way, said stand comprising a body supportably employable beside said chassis, and at least one ledge pivotally extendable from said body to abut against a side of said chassis so as to hold said chassis in position by said predetermined way in cooperation with said body, wherein the ledge has two arm portions cantileveredly depending from two opposite sides of the ledge, an inner surface of each arm portion is facing and spaced apart from a corresponding one side of the ledge in parallel, a pivot portion is formed at an outer surface of each arm portion for pivotably connecting to the body, two first engaging portions are formed at a peripheral edge of each arm portion to selectively engage with a second engaging portion of the body thereby fixing the ledge at a position of holding the chassis or a folded position to save space.

15. The electronic device as claimed in claim 14, wherein another ledge is attachably extendable from said body to abut against another side of said chassis in order to hold said chassis in position together with said body and said at least one ledge.

16. The electronic device as claimed in claim 15, wherein said at least one ledge and said another ledge are pivotally attached to said body respectively, and capable of abutting against said body respectively to minimize occupied space of said stand.

17. The stand as claimed in claim 1, wherein two recesses are defined in the upper surface of the support body from the pivot axes of the clamping ledges towards each other, so as to totally receive the clamping ledges in the upper surface when the second cutout engages with the protrusion of the support body.

* * * * *